United States Patent [19]

Choquenet et al.

[11] Patent Number: 4,584,100
[45] Date of Patent: Apr. 22, 1986

[54] FILTER PRESS COMPRISING MEANS FOR FILTERING MUD

[75] Inventors: Pierre Choquenet; Jean C. Carle, both of Chauny, France

[73] Assignee: Societe Choquenet S.A., Chauny, France

[21] Appl. No.: 572,468

[22] Filed: Jan. 20, 1984

[30] Foreign Application Priority Data

Jan. 20, 1983 [FR] France ............................ 83 00816

[51] Int. Cl.⁴ ............................................ B01D 25/12
[52] U.S. Cl. .................................. 210/225; 210/230; 100/198; 100/205
[58] Field of Search ............... 210/224, 225, 226, 227, 210/228, 229, 230, 231; 100/196-200, 205

[56] References Cited

U.S. PATENT DOCUMENTS

| Re. 27,118 | 4/1971 | Juhasz | 210/225 |
| 3,647,082 | 3/1972 | Ishigaki | 210/225 |
| 3,807,567 | 4/1974 | Iwatani | 210/225 |
| 4,032,450 | 6/1977 | Iwatani | 210/230 |
| 4,108,777 | 8/1978 | Kurita | 210/225 |
| 4,169,056 | 9/1979 | Sakuma | 210/225 |
| 4,181,615 | 1/1980 | Wilms | 210/230 |
| 4,219,425 | 8/1980 | Yoshida | 210/225 |
| 4,289,622 | 9/1981 | Schotten | 210/225 |

FOREIGN PATENT DOCUMENTS

| 55-37929 | 10/1980 | Japan | 210/225 |
| 55-46206 | 11/1980 | Japan | 210/225 |
| 56-12164 | 3/1981 | Japan | 210/230 |

Primary Examiner—Ernest G. Therkorn
Attorney, Agent, or Firm—Brisebois & Kruger

[57] ABSTRACT

The invention relates to filter presses comprising a frame 5 controlling the displacement of means for extracting the filter cake between a position of filtering and a position of cleaning, said frame 5 being formed of at least two posts 6, 7 mounted slidingly in guide means 8, 9 provided on the lateral edges of each plate 1, 2 and which carry at their free ends crosspieces, one of which has two lateral fingers 13, 14, cooperating with a control bar 15, 16 which is actuated by control means adapted to displace the unit of filter frames.

7 Claims, 5 Drawing Figures

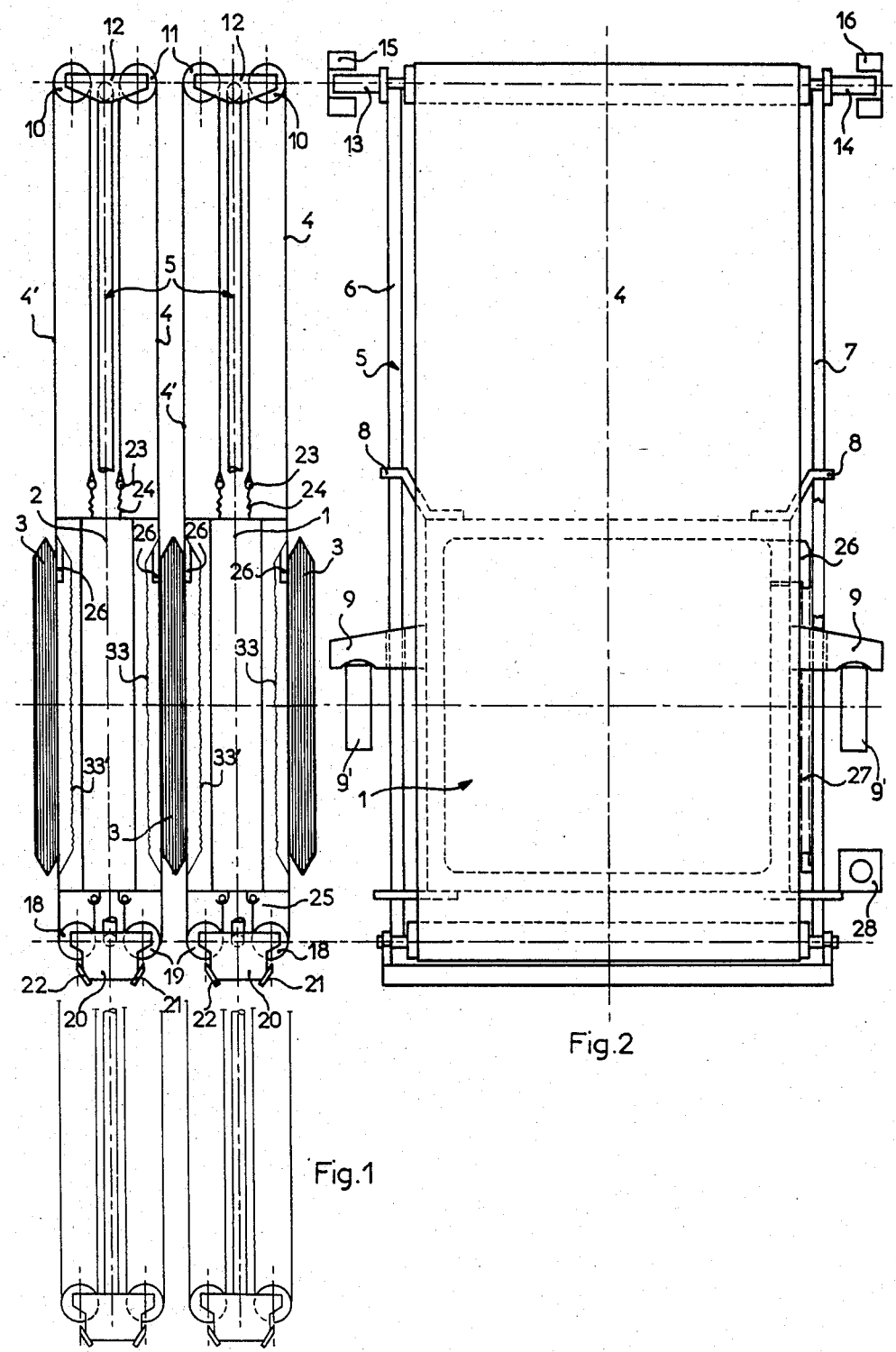

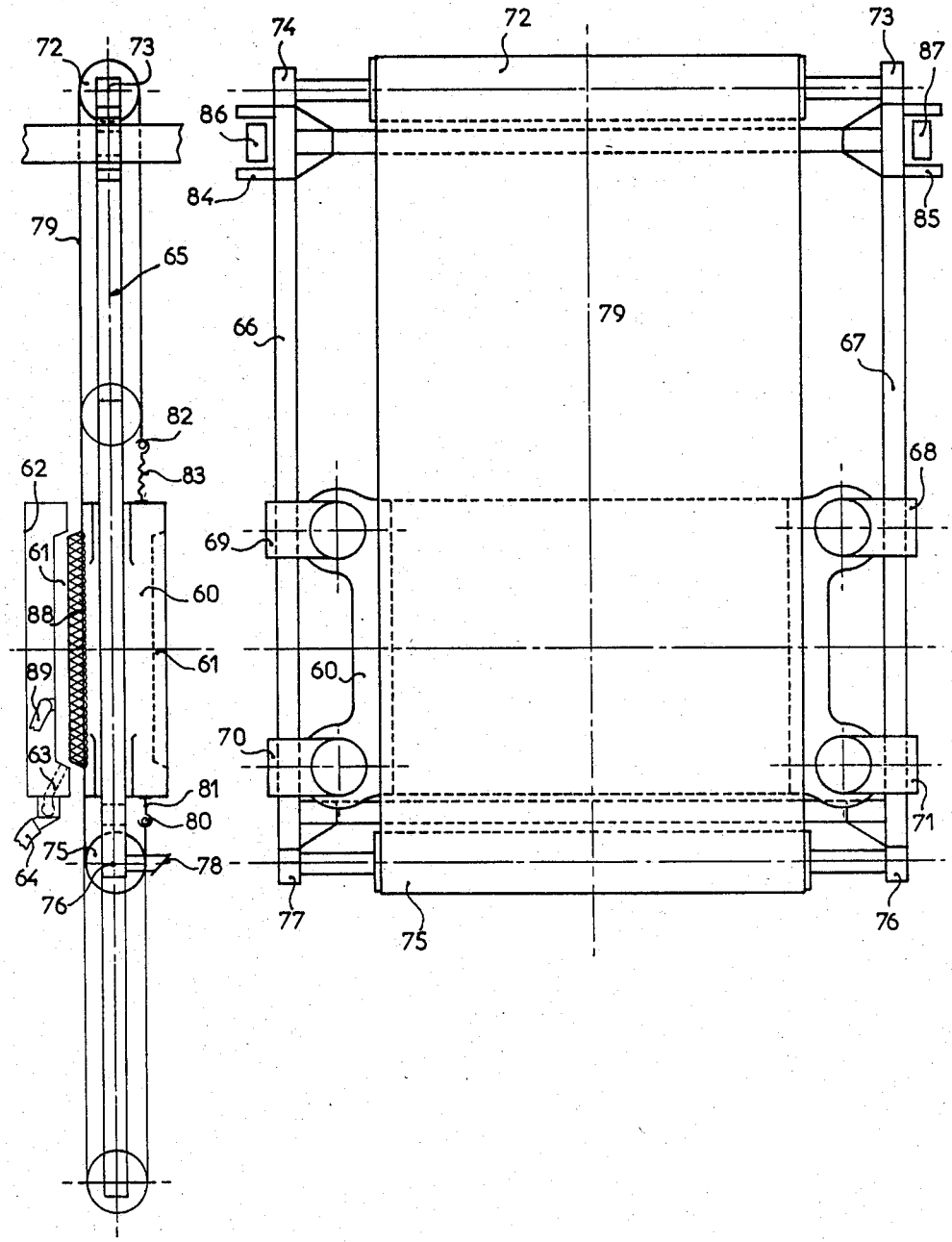

FILTER PRESS COMPRISING MEANS FOR FILTERING MUD

BACKGROUND OF THE INVENTION

The present invention relates to a filter press comprising two fixed stations, interconnected by a frame which is formed of at least two parallel rails on which a plurality of platforms are slidingly mounted, between which filter cloths extend, with one of said fixed posts comprising a movable head for pressing said plates against one another during the filtering step and means which are provided for spacing said plates from one another during the clearing step.

According to a known structure of such filters, the filter is provided with a single cloth which extends in zig-zag form between the different plates on the entire length of the filter. Such an arrangement has the drawback of making it difficult to stretch this single cloth in a suitable way during the filtering step and, upon breaking or using up of a portion of the cloth, making it necessary to replace the entire cloth which is, of course, a long and costly operation.

In addition, during the clearing of the plates, the filter cakes do not always fall down under the action of gravity but remain often attached to the cloth. This means that the filter cakes must be removed manually from between the pieces of the cloth.

To obviate the latter shortcoming, it has already been proposed (in the LAROX process) to use for each plate a separate cloth which forms a closed loop and which is guided on guiding and driving rollers arranged below and above each plate. In ths case the filtering takes place across the two cloth pieces which extend opposite the plate and which runs into the risk of the catching of the remaining mud particles between the cloth pieces which cannot be easily removed. Furthermore, in this known structure only one of the surfaces of each plate comprises a curved surface cooperating with the filter cloth. This leads to a reduction to half of the capacity of the filter press relative to a given number of plates. Also, in this case the soiled surface of the cloth partially gets in contact with the plane surface of the adjoining plate. Finally, the guiding means of the cloths are complex and can be applied to the technique of filter presses only with difficulty. As a matter of fact, each cloth has separate driving means, which fact leads to a complicated and expensive structure, because said means must be moved with each plate upon clearing operations and the closing of the filter.

In another known device which can only be used with vertical filter presses (method PARMENTIER), each plate is surrounded by an endless loop of filter cloth which moves on two rollers, arranged outside of the plate and comprising means for driving the cloth.

The rollers are installed, one underneath the other, in bearings, slidingly mounted in the common structure.

The rollers are thus completely independent from the corresponding plates.

The frame carries the operatively connected driving means which are controlled by pneumatic means and a motor reducing means.

In this structure also, only one surface of each plate is utilized, and the control means for the cloths and the plates are extremely complex and expensive.

BROAD STATEMENT OF THE INVENTION

It is an object of the present invention to provide a filter press comprising for each plate a separate cloth and which obviates the above-stated drawbacks of the two prior art structures.

Moreover, it is an object of the invention to provide individual guiding and control means for the cloths which are of simple structure and can be adapted to horizontal filter presses as well as to existing vertical ones.

The filter press according to the invention is of the type comprising for each plate at least one filter cloth which is movably mounted with respect to the plate, between a filtering position and a clearing position in which the filtering portion is bent toward the outside so that the filter cake can be removed.

According to the invention, each plate comprises a frame which controls the means for extracting the filter cake between a filtering and a clearing position, said frame being formed of at least two posts mounted slidingly in guides provided on the lateral edges of each plate and which carry at their free ends cross pieces, one of which having two lateral fingers cooperating with a control rod which is actuated by control means adapted to displace the unit of filter frames.

When the filter is of the type in which each plate comprises two curved surfaces, each cooperating with a separate filter cloth, said frame carries at its free ends bearings for two pairs of guide rollers. At the other end of the frame, opposite each roller, a scraper element is provided, with one of the return pieces of the two filter cloths being fixed by means of rods on hooks provided on the smaller side of said plate.

In the embodiments of the filter according to the invention, the mud to be filtered is put into each filtration chamber in a known manner by a flexible tube which is connected to a pipet, engaged tightly between two filter cloths.

The invention also concerns filters of the type comprising a vertical pile of plates, each of which having an inner curved surface and an outer plane surface, before which the filter cloth extends.

According to the invention, said frame carries at its free ends bearings for two guide rollers and at one of the ends two lateral guides, cooperating with the control rod of said control means, with one of the return pieces of the filter cloth being fixed by means of a rod and a stretching device on one of the small sides of the plate, whereas the other return piece is fixed by a rod on a hook povided on the other small side of said plate.

Finally, in case of filters with plates having two curved surfaces of the type comprising interposed smooth plates for the introduction of the liquid to be filtered, the invention provides that the movable frame of each interposed plate comprises two scraper means which are displaced along the smooth surfaces of the plate, for scraping off the filter cake.

BRIEF DESCRIPTION OF THE DRAWINGS

Other embodiments and advantages of the invention will become obvious upon reading the following description which shows, by way of example, three embodiments of the improvement according to the invention, with reference being made to the accompanying drawings.

In the drawings:

FIG. 1 is a lateral schematic elevational view which shows the application of the invention to a filter with vertical curved plates in chambers comprising two filter cloths.

FIG. 2 is a frontal schematic elevational view of the plate, the filter cloth and its movable frame as shown in FIG. 1.

FIG. 4 is a lateral elevational view showing the application of the invention to a vertical filter with horizontal plates.

FIG. 5 is a plan view of the unit shown in FIG. 4.

DETAILED DESCRIPTION

Figure 3:
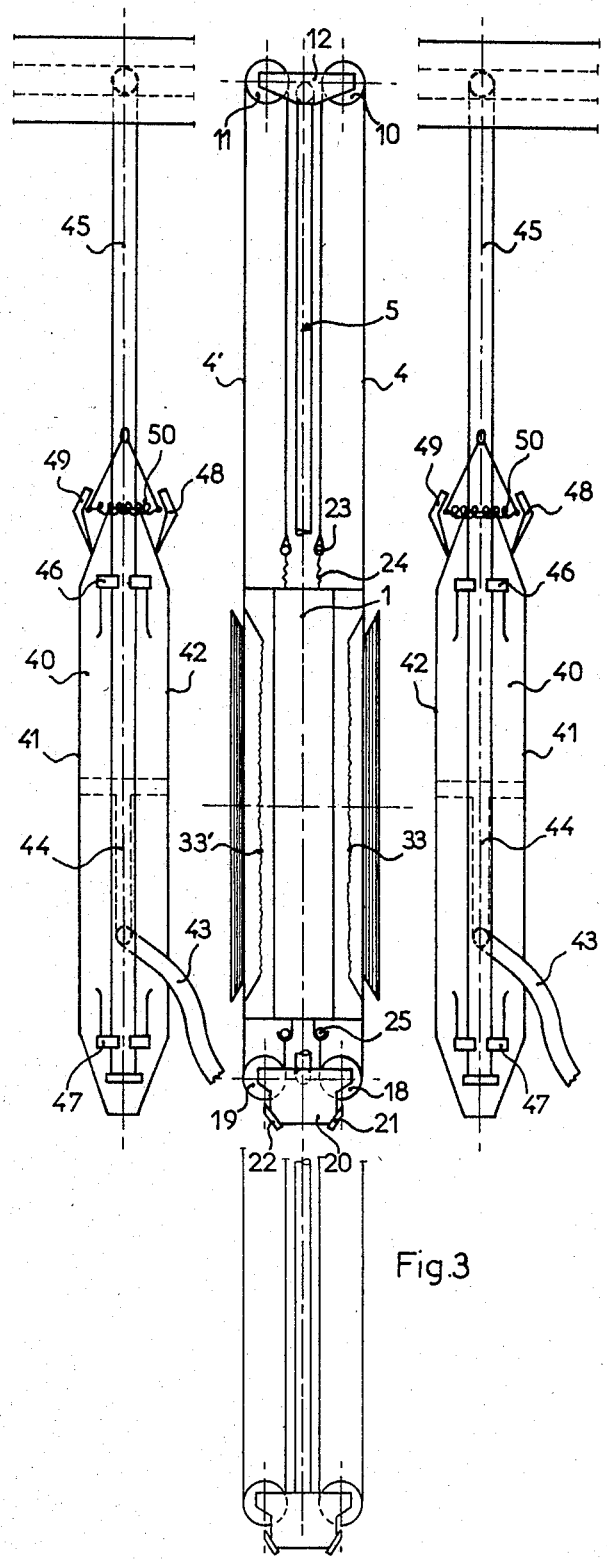
FIG. 3 is a lateral schematic elevational view showing the application of the invention to a horizontal filter with curved plates and interposed vertical feeding plates, provided with their movable scraping frames.

In FIG. 1 A chambered or recessed plate 1 is shown which comprises oppositely facing chambers 33, 33' and the adjacent chambered or recessed plate 2 which also has oppositely facing chambers 33, 33'. The filter cake 3 has been formed between the two filter cloths 4 and 4'. According to the invention, each plate comprises a movable frame 5 having at least two posts 6 and 7 which can slide in lateral guides 8 and 9. The respective plates 1 are supported for movement toward and away from each other on parallel rails 9' and 9' at opposite sides of the plates by outwardly extending arms of guides 9, 9. At one of the ends of the frame there is a pair of rollers 10, 11 which are supported by bearings 12 being integral with the frame. Further, the upper end of the frame 5 comprises lateral fingers 13 and 14, cooperating with the lifting and lowering rails 15 and 16 which are common to all the plates of the filter press. The rails 15 and 16 can be displaced by suitable control means (hydraulic jacks, sprocket wheels) between an upper position shown in solid lines in FIG. 1 and a lower position shown in dot-dash lines in FIG. 1. The lower end of the frame 5 comprises a pair of rollers 18, 19, mounted on bearings 20 which are integral with the frame 5 and also carry a pair of scrapers 21, 22.

The assembly of the two filter cloths 4, 4' of each plate is symmetrical. The filter cloth 4 extends in front of the chamber 33 of the plate 1. Its upper part is rolled around the roller 10 and is attached by means of a rod 23 to an elastic stretching device 24. The lower part is rolled around the roller 18 and its free end is attached by a rod 25 to hooks fixed on the lower part of the plate 1.

The mud to be filtered is fed into each chamber by a pipet 26 arranged in a tight manner between the filter cloths of the two adjacent plates 1 and 2. This pipet is connected by a flexible tube 27 to a mud feeding pipe 28, preferably made of a group of sections which are integral with the plates and are provided with tight joints. When the filter is closed, they form the feeding pipe 28.

When the frame 5 of each filter plate is in the upper position (shown in full lines in FIGS. 1 and 2), the active portions of the filter cloths are positioned opposite the chambers 33, 33' of the plates, with the filter being closed and the mud to be filtered being moved through the pipe 28, the tube 27 and the pipet 26 into the filtering chamber formed between two adjacent filter cloths.

After the filtering step the plates are separated from one another, and the frames 5 are moved by the rails 15, 16 into their lower position (shown in the dashed line in FIG. 1).

The filter cloths 4 and 4' must thus descend and roll downwardly around rollers 18 and 19 because their upper return piece shortens when the lower piece lengthens. The filter cloths move the filter cake downward where it is removed by the scrapers 21, 22. Thereafter the movable frame is returned by its rails 15, 16 into its upper position for a new filtering operation. On the lower bearings 20 between the rollers 18 and 19 a washing ramp is mounted which is connected to a source of water under pressure. This allows unclogging of the filter cloths without disassembling them in a dry run.

FIG. 3 shows the application of the invention to a filter comprising chambered plates with the movable frame of FIG. 1 and interposed plates 40 for introducing the liquid to be filtered. Each plate 40 which is held on the structure of the filter press by means not shown, comprises two smooth surfaces 41 and 42. This leads to the fact that upon closing of the filter press, the filter cake is formed only in the chambers 33 and 33' along each plate 1. A flexible tube 43 leads the mud into a channel 44 inside the plate 40, and emerges on the two surfaces 41 and 42. The plate 40 is provided with a movable frame 45, comprising at least two posts sliding in the guide means 46 and 47 which are integral with the plate 40. On the posts of the frame 45 are fixed, on both sides of the plate, scrapers 48 and 49 which are held back by elastic means 50. The upper end of the frame 45 is engaged in the same control rails 15 and 16 as the frame 5 of the chambered plate 1. When the frame 45 descends, the scrapers 48, 49 descend accordingly along the surfaces 41, 42 of the plate 40 and remove any filter cake adhering to the surfaces. Without leaving the scope of the invention, it is possible to provide anjacent plates which carry a chamber on one surface and a scraper on the other one.

FIGS. 4 and 5 show the application of a device according to the invention to vertical filter presses and horizontal plates.

In this embodiment one plate 60, disposed horizontally, comprises a lower chamber 61 and a plane upper surface 62, carrying on the surface opposite the chamber flow channels for the filtrate. An inside channel 63, connected to a flexible tube 64, leads the mud to be filtered into the chamber 61. The bottom of the chamber is covered with a membrane 88 in a known manner, which membrane is connected to a source 89 of compressed air for compacting the filter cake and ejecting it from the chamber. A movable frame 65, comprising at least two posts 66 and 67, can glide in the lateral guides 68, 69, 70, 71 of the plate 60. The outer end of frame 65 carries a roller 72 mounted in the bearings 73, 74 which are fixed on the posts 66, 67. The front end of the frame 65 comprises in the same way a roller 75, mounted in the bearings 76, 77 which are fixed on the posts 66, 67. The bearings 76, 77 also carry a scraper 78.

The filter cloth 79, attached by a rod 80 to hooks 81, fixed on the front portion of the plate, is rolled around the rollers 75, passes over the surface of the plate, is rolled around the roller 72 and is attached by a rod 82 to a tensioning device 83 which is fixed to the rear portion of the plate.

The rear end of the frame also comprises near the roller 72 two lateral fingers, 84, 85 which cooperate with bars 86, 87, controlling the horizontal displacement of the movable frame 65.

The operation of this device is identical to the one of the embodiments shown in FIGS. 1, 2 and 3. During the filtering step the frame 65 and the filter cloth 79 extend in the position shown in full lines in FIGS. 4 and 5. During the clearing step the frame is guided into the position shown in the dashed line in FIG. 4. The filter cloth 79 thus extracts the filter cake 88, and the scraper 78 removes it from the filter cloth as the cloth rolls around and over the roller 76.

The invention is not limited to the embodiments described and shown herein, but includes also numerous modifications which fall under the scope of the invention.

We claim:

1. In a filter press of the type comprising two fixed supports, inter-connected by a frame and comprised of at least two parallel rails on which a plurality of separate plates are mounted so that the plates can be pressed against one another during a step of filtration, and can be separated from one another for extraction of a filter cake formed during filtration, and in which at least alternate ones of said plates comprise a filter plate having at least one filter surface, the improvement comprising a plurality of filter cloth support frames, one for each filter plate, each filter cloth support frame being of a length greater than the length of a filter plate and comprising at least two parallel posts, guide means at opposite sides of each filter plate for mounting said posts and frame for longitudinal sliding movement relative to said filter plate, a first roller connected to said support frame at a location beyond one end of the filter plate, a second roller connected to said support frame at a location beyond the other end of said filter plate so that the filter plate is between said first and second rollers, a plurality of separate filter cloths, each filter cloth extending across a filter surface of a filter plate and being mounted on said first and second rollers, first means for connecting a first end of said filter cloth to one end of said filter plate, and second means for connecting a second end of said filter cloth to the other end of said plate, so that said filter cloth rolls around said rollers in response to longitudinal sliding movement of the support frame relative to the filter plate, and control bar means engaging each frame for simultaneously moving said filter from a first position in which the filter cloth extends across the filter surface of a filter plate to perform a filtering step, and a second position in which the filter cloth with filter cake thereon rolls around said second roller to remove filter cake from the filter cloth.

2. A filter press according to claim 1 further comprising a scraper on said filter frame adjacent said second roller for scraping filter cake from the filter cloth as the cloth rolls around the second roller.

3. A filter press according to claim 1 wherein said first means for connecting the first end of the filter cloth to the filter plate includes elastic means for maintaining the filter cloth tensioned between the rollers.

4. A filter press according to claim 3 wherein said first and second ends of the filter cloth to the filter plate each include a hook for rapidly connecting the filter cloth.

5. A filter press according to claim 1 in which each filter plate comprises two filter surfaces, a separate filter cloth for each filter surface, and wherein said frame has two pairs of guiding rollers at opposite ends of the filter plate.

6. A filter press according to claim 1 comprising a vertical stack of plates, each with a lower filter surface an an upper plane surface across which the filter cloth extends.

7. A filter press according to claim 1 comprising interposed smooth plates between said filter plates for the introducion of the liquid to be filtered, each smooth plate having a frame and comprises two scraping devices which are moved along the smooth surfaces of the plate for removing the filter cake, in response of movement of said frames between first and second longitudinal positions relative to said smooth plates.

* * * * *